(12) United States Patent
Mareachen

(10) Patent No.: US 8,044,989 B2
(45) Date of Patent: Oct. 25, 2011

(54) MUTE FUNCTION FOR VIDEO APPLICATIONS

(75) Inventor: Russell Mareachen, Winfield, IL (US)

(73) Assignee: General Instrument Corporation, Horsham, PA (US)

( * ) Notice: Subject to any disclaimer, the term of this patent is extended or adjusted under 35 U.S.C. 154(b) by 1129 days.

(21) Appl. No.: 11/609,589

(22) Filed: Dec. 12, 2006

(65) Prior Publication Data

US 2008/0136895 A1    Jun. 12, 2008

(51) Int. Cl.
*H04N 7/14* (2006.01)
(52) U.S. Cl. .................................................. 348/14.08
(58) Field of Classification Search ............... 348/14.01, 348/14.07, 14.08, 14.09
See application file for complete search history.

(56) References Cited

U.S. PATENT DOCUMENTS

| 5,774,591 | A | | 6/1998 | Black et al. |
| 6,020,916 | A | * | 2/2000 | Gerszberg et al. .......... 348/14.07 |
| 7,564,476 | B1 | * | 7/2009 | Coughlan et al. .......... 348/14.08 |
| 2004/0012613 | A1 | * | 1/2004 | Rast ........................... 348/14.01 |
| 2005/0073574 | A1 | | 4/2005 | Krisbergh et al. |
| 2006/0057550 | A1 | | 3/2006 | Sahashi |

* cited by examiner

*Primary Examiner* — Stella Woo

(57) ABSTRACT

A mute function is provided that allows a user to mute a video application without alerting other participants to the muting. A user participating in the video application selects the mute function, which causes the user's video device to present a virtual image of the user to the other participants of the video application. Therefore, the other participants to the video application may continue to believe that the user is actively participating in the video application when, in fact, the user has selected the mute function and may be engaging in other activities.

16 Claims, 5 Drawing Sheets

MUTE FUNCTION FOR VIDEO APPLICATIONS

BACKGROUND

Mute functions are common in voice applications, such as telephone calls. Mute functions for telephone calls allow a user to temporarily cease one-way audio transmissions to other participants of the telephone conversation. Thus, a user may continue to hear the audio transmissions of other participants while blocking the user's own audio transmissions. Mute may be employed by a user to mask a temporary disturbance such as a sneeze, cough, or other distraction. The mute function also allows a user to have a private conversation with a third party while engaged in the telephone call with another participant.

Mute functions are desirable in telephone applications, in part, because they can be used furtively. Other participants to a telephone conversation often have no idea that a mute function has been invoked. This allows a user to disguise a distraction or engage in another activity during a call. However, for videophones, a user cannot surreptitiously invoke a mute function because the other participants to the video call can visually determine if the user is not actively participating in the video call by observing that the user is having another conversation with a third party or has left the viewing area of the video camera.

Conventional attempts to mute video applications involve the closing of the camera aperture so that other participants to the video application are presented with a blank screen. Therefore, conventional attempts to mute video applications alert other participants that the user is not actively participating in the video call.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

According to an example, a method and system described herein allows for the muting of a video application. Video application refers to the use of any hardware, software, or combination of software and hardware that supports the capture or presentation of video images or a combination of capturing and presenting video image and audio. For example, video applications include videophones and videoconferencing devices. Muting refers to the function of blocking live one-way communications of a user. For example, in conventional telephone calls, muting blocks the audio transmissions of the user that invoked the mute function while still allowing the user to receive unimpeded audio transmissions from other participants of the telephone call. Muting in video applications, as described herein, involves the blocking of live video and/or audio transmissions from the user that invoked the mute function without effecting the user's ability to receive unimpeded live audio and video from other participants to the video application. Therefore, the user invoking the mute function may engage in other activities or leave the viewing area of the user's image capture device without alerting other participants that the user is not actively participating in the video application.

Instead of viewing the live video captured by the user's video device, in response to the selection of a mute function, other participants to the video application are presented with a virtual image. The virtual image may be any modification to the live images captured and presented during a video application. The virtual image may include a representation or partial representation of the user, including stored video or still images of the user, computer generated images of the user, modified live images of the user, and combinations thereof. The virtual image of the user may be generated by a variety of different methods, as described in more detail below.

Other participants to the video application may not be notified or alerted that the user has invoked a mute function and replaced live video with a virtual image. In fact, the presentation of the virtual image of the user may be seamlessly integrated with the cessation of live images of the user such that other participants to the video application are unaware of the transition.

Figure 1:
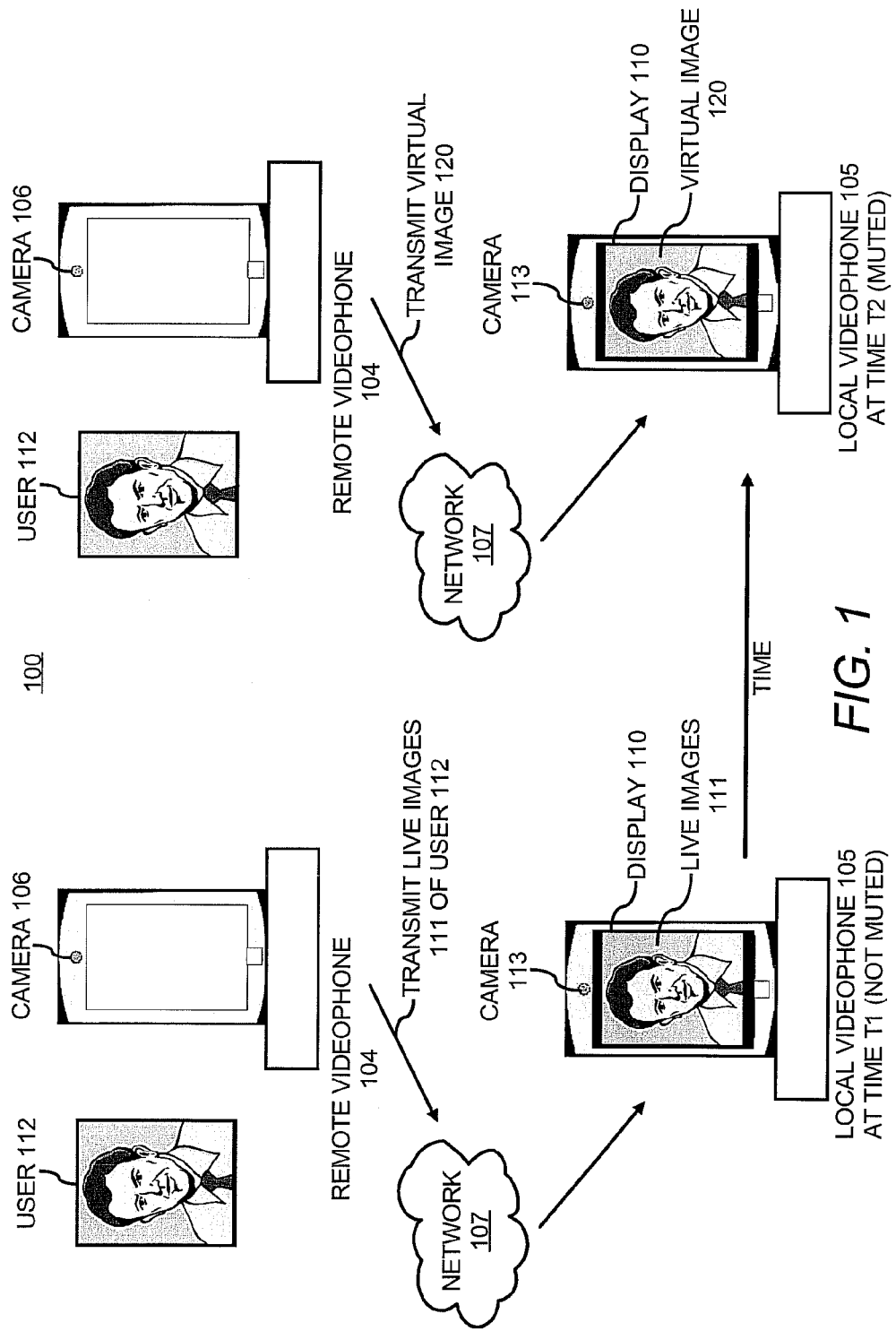
FIG. 1 illustrates a videophone application of a mute function.

FIG. 1 depicts an illustrative videophone application 100 of a mute function. The videophone application 100 depicts a remote videophone 104 capturing live images 111, such as live video images, of a user 112 with a camera 106. A person having ordinary skill in the art will appreciate that the videophones described herein may also capture and transmit audio data and may contain components not illustrated, such as microphones, speakers, etc. The live images 111 of the user 112 may be sent to a local videophone 105 at time T1 through a network 107. The network 107 may be any network capable of facilitating the transfer of data, such as the Internet, an intranet connection, a Local Area network, a Wide Area network, a Personal Area Network, wired, wireless, etc. The videophone 105 receiving the live images 111 of the user 112 has a camera 113 and a display 110. The live images 111 of the user 112 are displayed to other participants of the video call on the display 110 of the local videophone 105 at time T1.

FIG. 1 also depicts the local videophone 105 at a time T2. Time T2 may be a time after time T1. At time T1 the user 112 of the videophone 104 has not invoked a mute function. However, at time T2, the user 112 has invoked a mute function at the remote videophone 104. The mute function may be selected by the user 112 at the user's remote videophone 104. Because a mute function has been invoked, the local videophone 105 at time T2 is no longer receiving live images 111 of the user 112. The local videophone 105 at time T2 shows an example of a virtual image 120 that may be displayed on the display 110.

The display 110 depicts an example of the remote videophone 104 applying the video mute function described herein. The display 110 is displaying a virtual image 120 of the user 112. The virtual image 120 may be any representation of the live images 111 captured by the camera 106 of the remote videophone 104 and transmitted to the local videophone 105 at time T1. The virtual image 120 may also include a representation of the user 112 and may be generated from a combination of stored video images of the user 112 and video images of the user 112 captured prior to the selection of the mute function. The virtual image 120 may include sequences of video images of the user 112 and may be continually modified to simulate live video of the user 112. For example, the virtual image 120 may include stored video of different gestures and movements commonly performed by the user 112. The stored video images of the user 112 may be used in the virtual image 120 to simulate common emotions and expressions made by the user 112 to present a more life-like virtual image 120 of the user 112. Therefore, participants to the video call may be unaware that the user 112 has invoked a mute function and that the user 112 may not be actively participating in the video call.

The term user, as used herein, refers both to a user actively participating in a video application and to any other individuals visible in the images captured by an image capture device. The virtual image 120 may include a representation of the primary user participating in the video application, which may be integrated with unedited images of the other individuals present in the captured images. In this example, the primary user may be identified by any means known in the art including log-on information, biometric information, and facial identification. Alternatively, the mute system may attempt to create a representation of all the individuals present in the images.

Figure 2:
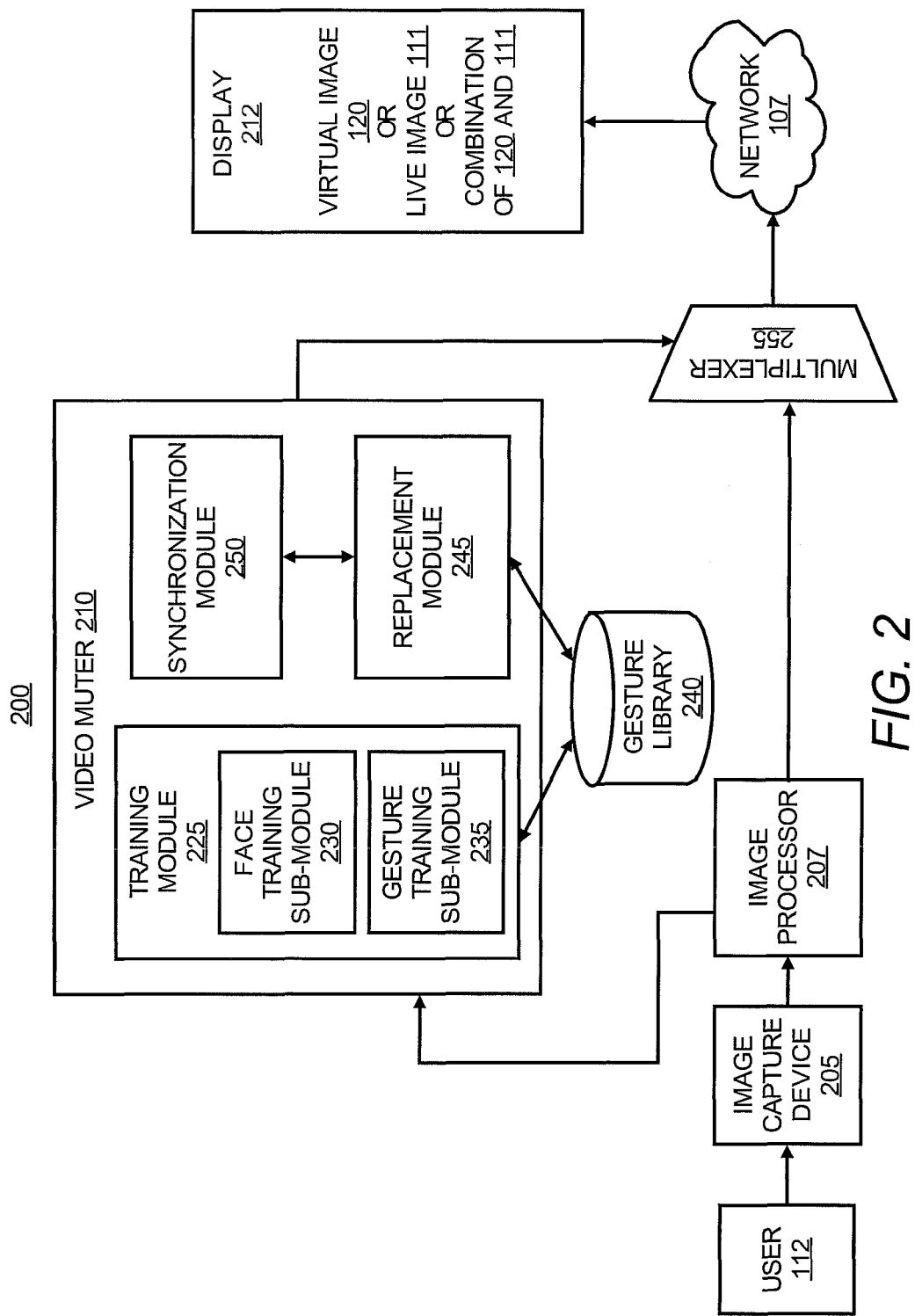
FIG. 2 illustrates a block diagram of video mute components.

FIG. 2 depicts an illustrative block diagram 200 of components of a video application which may facilitate a video mute function. FIG. 2 includes an image capture device 205 inputting live images 111 of a user 112 into an image processor 207. The video application may be a video call, for example, where the image capture device 205 and the video muter 210 may be components of a videophone, such as the remote videophone 104 shown in FIG. 1. The videophone may be transmitting video data to the display 212, which may be a component of another videophone participating in the video call, such as the local videophone 105 shown in FIG. 1. During the video application, the display 212 may display live images 111 received from the image capture device 205 to other participants of the video application. In response to the selection of a mute function, the display 212 may no longer receive and display live images 111 and may, instead, receive and display a virtual image 120 generated by the video muter 210, as described in greater detail below.

The video muter 210 may store images and data in the gesture library 240. The images and data stored in the gesture library 240 may be used by the video muter 210 to generate the virtual image 120. The virtual image 120 may also be generated using previously recorded live images 111 received from the image capture device 205. The live images 111 may be received and processed by a training module 225. The training module 225 may include a face training sub-module 230 and a gesture training sub-module 235, which will be described in greater detail below. The training module 225, and the components thereof, may store the received live images 111 in the gesture library 240. When a mute function is invoked, the replacement module 245 and the synchronization module 250 may retrieve the data stored from the gesture library 240, create a virtual image 120, and transmit the virtual image 120 to the display 212 for presentation to the participants of the video application.

The image capture device 205 may be any hardware or combination of hardware and software capable of capturing video images, still images, or any combination of video and still images. For example, the image capture device 205 may be a video camera or "web" camera. The image capture device 205 may be a stand-alone device capable of transmitting, or otherwise transferring, captured images either wirelessly, through a wired connection, or through a portable storage medium to any other device or software. The image capture device 205 may capture images, which may be processed by an image processor 207. The image processor 207 may include any hardware, software, or combination of hardware and software for processing and transferring image data that is known in the art. For example, the image processor 207 may include MPEG decoders and devices providing for MPEG compression. Although the image capture device 205 and the image processor 207 are illustrated in FIG. 2 as two separate components, a person having ordinary skill in the art will appreciate that the image capture device 205 and the image processor 207 may be a single integrated device. The image capture device 205 and image processor 207 may also be integrated into any other device. For example, the image capture device 205 and image processor 207 may be components of a videophone or personal computer.

The image processor 207 may transfer images, captured by the image capture device 205, to the video muter 210 or directly to a multiplexer 255. The multiplexer 255 may be any hardware, software, or combination of hardware and software known in the art, which is capable of switching between multiple data streams or inputs into a single data stream or output. The multiplexer 255 may transmit image data, such as live images 111 through any network 107 to the display 212. The display 212 may be any hardware or combination of hardware and software capable of generating an image, which may be perceived by a user. The display 212 may be stand-alone device or may be integrated into any other device. For example, the display 212 may be a computer monitor or may be a liquid crystal display (LCD) screen, or any other type of video screen, integrated into a videophone or any other video conferencing device. The display 212 may receive images from the multiplexer 255 through any form of wired or wireless connection, or network described above. The display 212 may receive and present live images 111 from the image capture device 205 and the video muter 210 and may also receive and present virtual images 120 created by the video muter 210.

The image processor 207 may also transmit, or otherwise transfer images to the video muter 210. The video muter 210 and the modules and sub-modules shown in the video muter 210 may be any hardware, software, or any combination of hardware or software capable of performing a step in the generation of a virtual image 120. The block diagram 200 illustrates the video muter 210 according to an example, including a training module 225, a gesture library 240, a replacement module 245, and a synchronization module 250. However, the video muter 210 may include more components than those depicted in FIG. 2 or fewer components than depicted in FIG. 2. For example, any of the components illustrated in FIG. 2 may be contained in a separate device and may communicate with the video muter 210 through any wired, wireless, or network connection. The video muter 210 may be a stand-alone device or may be integrated into any other device. For instance, the video muter 210 may be a component of a videophone or any other video conferencing device.

The video muter 210, illustrated in the block diagram 200, includes a training module 225, which further includes a face training sub-module 230 and a gesture training sub-module 235. The training module 225 is operable to analyze images or portions of images of a person's face, body, clothing, hair, etc., background images, and images of inanimate objects. The training module 225 may analyze images to determine attributes such as position, shape, size, color, etc. The face training sub-module 230 is operable to detect and analyze facial features. For example, the face training sub-module 230 may detect a person's face within a larger image and may determine the locations, shape, sizes, color, etc of facial features. The gesture training sub-module 235 is operable to detect and analyze any motion or movements. For example, the gesture training sub-module 235 may detect that a user turned the user's head at an angle or raised the user's hand. The gesture training sub-module 235 may determine the distance, speed, angle, direction, depth, etc. of any motion. The gesture training sub-module 235 may use this information to create vector motion models, which are detailed analyses, descriptions, and data associated with movement.

The training module 225, the face training sub-module 230, and the gesture training sub-module 235 may analyze and store live images 111 as data, which may be used to create the virtual image 120. The data may include any information about the captured live images 111 and may be used to create user and object templates. Templates are collections of data about a user or object. The data collected in a template may include the results of the analysis performed by the training module 225, the face training sub-module 230, and the gesture training sub-module 235. For instance, templates may include the analyzed details of a user's facial features and the common motions that a user or object may make. A template may include video clips or a series of still images of a user or object. For example, a particular user may have a unique smile or may routinely touch a region of the user's face. Therefore, the user's template may include video clips of the user smiling and touching his face.

Templates may also store information and images related to inanimate objects. For example, the image capture device 205 may capture live video images of a user participating in a video conference. The user participating in the conference may desire to surreptitiously invoke a mute function such that other members of the video conference are unaware of the invocation of the mute function. To generate a realistic virtual image 120, the background behind the user and any other objects captured by the image capture device 205 must also be recreated in the virtual image 120. In certain instances, the user may be sitting near a moving or changing inanimate object, such that, even if a virtual image 120 of the user and the user's background were created and presented, the moving object captured by the video capture device 205 would provide an indication that live video was no longer being displayed.

Therefore, the training module 226 or the gesture training sub-module 235 may receive images and analyze the movement of the inanimate object to create a template for the object. For instance, if the object has a regular repeating pattern of movement, the training module 225 may determine that the object moves left to right, for example, for a specific distance and for a specific amount of time. The template created and stored by the training module 225 may simply be a representative video clip of the object moving in its regular pattern. The template may also include data concerning the time, distance, and pattern of the movement so that a vector motion model of the motion of the object may be generated and stored in the template. Vector motion models include analyses, descriptions, and data associated with movement. Vector motion models may include direction, distance, and duration data.

In other examples, the training module 225 or gesture training sub-module 235 may also predict the movements or changes an inanimate object may make. For example, the training module 225 may have the ability to recognize both digital and analog clocks and watches, determine the time the clock or watch is reading, and predict the changes the clock or watch will make as time passes. In this manner, the video muter 210 may create a virtual image of moving or changing inanimate objects to create a more realistic representation of live images.

Figure 3:
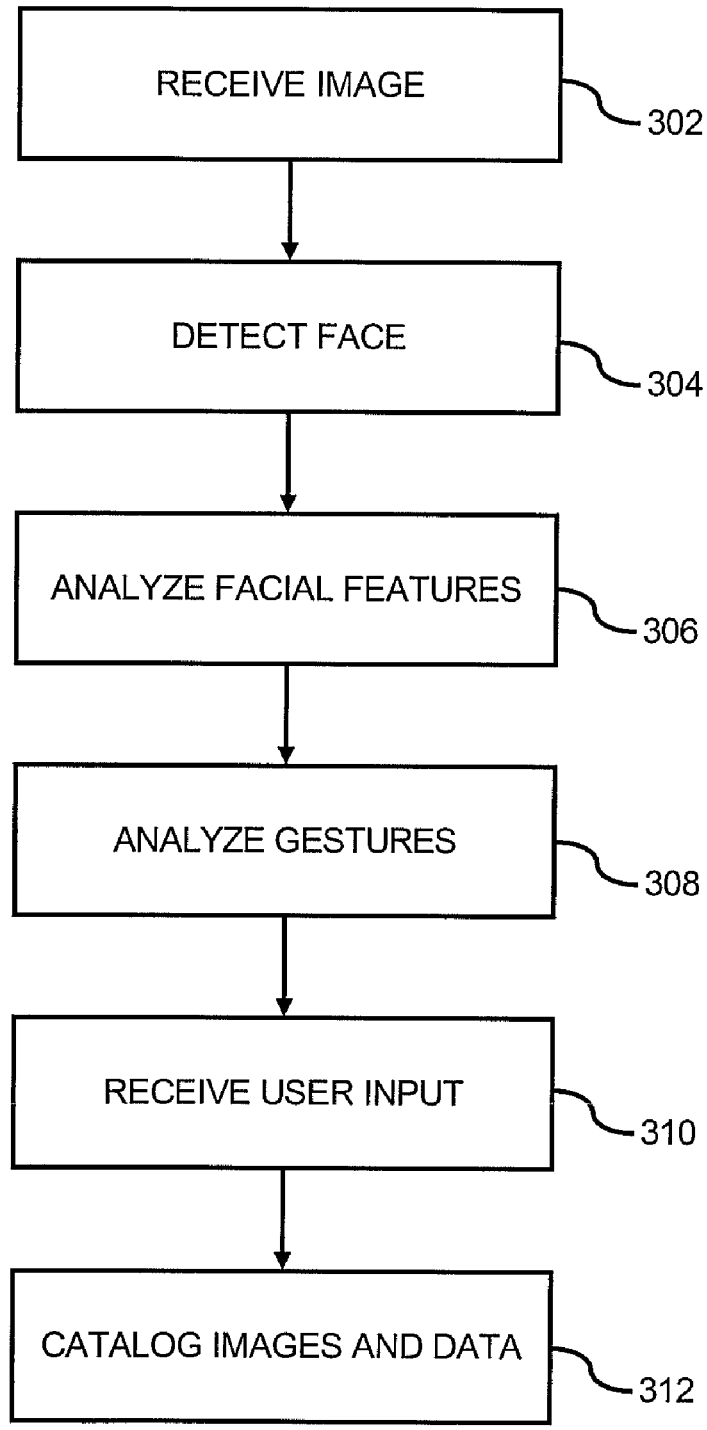
FIG. 3 illustrates a flow chart of a method for creating a user template.

FIG. 3 depicts a flow chart of an illustrative method 300 of a training process, which may result in the creation of a user template. The method 300 is described with respect to the block diagram 200 illustrated in FIG. 2 by way of example and not limitation and it will be apparent that the method 300 may be used in other systems. Moreover, it will also be apparent to a person having ordinary skill in the art that certain steps in the method 300 are optional and that a user template may be generated without performing certain steps in the method 300. Similarly, additional steps may be inherent or added to the method 300.

At step 302, an image may be received. The image may be received by the video muter 210 and, specifically, by the training module 225. The image may be received from the image processor 207 and may include an image of a user or the user's face. The image may be live video of the user, a series of still images of the user, or any combination thereof.

At step 304, a face is detected. The face may be the face of the user and may be detected by the face training sub-module 230. The face may be detected from a still image or from a frame within video images. The method used to detect the face is not essential and any process known in the art may be employed, including, but not limited to, Adaboost based algorithm's using Haar-like features and a cascaded classifier structure. A description of Adaboost based face detection may be found in Yang et al., "Face detection for automatic exposure control in handheld camera," I.E.E.E. International Conference on Computer Vision Systems, 2006, which is hereby incorporated by reference.

When a face has been detected, at step 306, the face may be analyzed and the facial feature information may be stored. The face may be analyzed by the face training sub-module 230 by any method known in the art. Analyzing the facial features may include creating a position structure of facial features by determining the relative positions, shapes, sizes, etc. and the distance between the features of the face, such as, eyes, eyebrows, nose, lips, etc. The facial feature information may also include the geometric relationships between the cascaded classifiers used for facial detection in step 304.

The facial feature information may be stored in a database or other storage unit. The facial feature information may be stored internally within the face training sub-module 230 or the training module 225. The facial feature information may also be stored anywhere outside the training module 225, such as the gesture library 240, for example.

The gesture library 240 may be a database or other storage unit configured to store any images or data that may be useful for generating the virtual image 120. For example, the gesture library 240 may store user templates, object templates, and any data used in an object or user template, such as images or video clips of a user or object, facial feature information, position structures of facial features, and any information regarding movement or motion of a user or object. The gesture library 240 may catalog and organize all the information specific to a particular user, such as images and video clips of a particular user, the user's facial feature information, and movement information for a particular user. The gesture library 240 may also store generic movement information not specific to any particular user. The generic movement information may be used to construct computer generated movements as will be described in greater detail below. The gesture library 240 may be a component of the video muter 210 or may be external to the video muter 210, as illustrated in FIG. 2.

At step 308, a gesture may be analyzed. Gesture refers to any movement or motion, or lack thereof, made by a user and may be analyzed by the gesture training sub-module 235. Gestures include any indicia of emotion, such as smiles, frowns, laughing, crying, sighing, yawning, sneezing, coughing, etc. Gestures also include any indicia that the user may be actively listening or participating in a video application and may include any other body movement, such as poses, hand movements, stances, weight shifts, slouching, etc.

Gestures may be analyzed by the creation of vector motion models based on the facial feature information generated by the face training sub-module 230. As set forth above, vector motion models include analyses, data, and descriptions of movement, including the movements of facial features. For example, the face training sub-module 230 may determine the positions of a user's mouth and eyes when the user is "at rest" or not performing any facial gestures. The gesture training sub-module 235 may then receive a video clip or a series of still images of a user smiling or laughing. The gesture training sub-module 235 may determine that when the user laughs, the user's mouth changes shape and moves by measured distances at measured directions. The information may be recorded as a vector motion model for a laugh. A user may have any number of different vector motion models for different levels of smiling, laughter, or any other gesture or emotion. The vector motion models may be cataloged in a particular user's template, which may be stored in the gesture library, as discussed above, or in any other database or storage module either within or external to the gesture training module 235. Vector motion models may also be created for inanimate objects and other individuals in an image.

At step 310, user input may be received. The user input may be received by the training module 225, the face training sub-module 230, or the gesture training sub-module 235. The user input may include an indication of the user's level of acceptance or satisfaction with a captured image, an analyzed face, or an analyzed gesture. For example, the user may consider a captured image unflattering or may determine that a captured gesture is uncharacteristic for the user. In these instances, the user may decide to eliminate the captured image or gesture and instruct the image capture device 205 to capture a new image or gesture.

Alternatively, the user may provide input indicating the user's acceptance or satisfaction with a captured image or gesture. User input may be received on a scaled system where the user votes on various aspects of a captured image or gesture. For example, a video clip may be captured of a gesture that a user commonly makes. The user may determine that on a scale of one to ten, for instance, with ten being the most frequent, that the gesture is made by the user with a frequency of eight. The user input of eight with respect to the level of frequency may be used by the gesture training sub-module 235 as a basis for the frequency with which that gesture will be recreated in the virtual image 120 of the user. Voting may be performed on any image or series of images and with respect to any aspect of the image or series of images, such as satisfaction, frequency, etc.

A person having ordinary skill in the art will appreciate that the method 300 may be practiced without the need for receiving user input. For example, all captured images and gestures may be analyzed and cataloged. In other examples, the training module 225, the face training sub-module 230, or the gesture training sub-module 235 may determine that a captured image or gesture is incomplete or unsatisfactory and may eliminate the image or gesture without the need for user input. For example, if the user is standing too far away from the image capture device 205 or moves outside of the frame of the image capture device 205 while performing a gesture, the captured images may be incomplete or unsatisfactory to be stored as a gesture. Similarly, user input may be received at any step within the method 300. For instance, a user may realize immediately that the user is not satisfied with a captured image and may provide user input prior to step 304 or at any other point in the method 300.

At step 312, the images and data may be cataloged. Cataloging refers to organizing the images and data. All the images and data associated with a particular user may be organized together and further sub-organized into any logical structure, such as facial feature information, gesture information, and voting results. The cataloged information may be stored as a user template in the gesture library 240.

The creation of templates through the training process provides the video muter 210 with a basis of images and data from which to construct a virtual image 120. A person having ordinary skill in the art will appreciate that the training process may occur automatically or "on the fly" during a video application without the need for a user to perform any training actions. For example, a user may initiate a video application, such as a video conference, where images of the user are captured by an image capture device 205 and transmitted to other device connected through the video conference. The captured images may be automatically analyzed and stored by the training module 225, the face training sub-module 230, or the gesture training sub-module 235. The captured images and resulting data may be stored and cataloged in the gesture library 240 as templates and used to create a virtual image 120 of the user.

Alternatively, the training process and the creation of templates may be actively performed by a user prior to engaging in a video application. For example, a user may perform a "set-up" or initialization process with a videophone or videoconferencing device. The set-up process may include a user providing a series of images and gestures to the video device and providing input associated with the images and gestures. The images and gestures may be repeated images and gestures captured at different angles, different levels of lighting, etc. A user may also store personal user templates as a file on a personal computer or portable storage media. Therefore, the user may transfer the user's own personal template to different video devices, either by transmitting the personal user template through a network or by physically moving the personal template in a portable storage medium to another location. In this manner, the user may input their personal template into multiple video devices, so that the user may instantaneously have an accurate and thorough template at any video device. A more extensive template results in a more realistic and life-like virtual image 120.

FIG. 2 further illustrates a replacement module 245 and a synchronization module 250. The replacement module 245 may be any hardware, software, or any combination of software and hardware capable of generating a virtual image 120. As set forth above, generating a virtual image includes creating a representation of a live image. The virtual image 120 may be created using a live image as a starting point and replacing elements of the live image with stored images and video. For example, a user may be participating in a video call and may be transmitting live video images of the user, as described in FIG. 1. To create a realistic representation of the live image, the replacement module 245 may utilize live video of the user captured prior to the selection of a mute function. Instead of repeating the live video images of the user in an unedited form while the mute function is in progress, the replacement module 245 may replace at least a portion of the images captured in the live video with stored images. That is, the replacement module may have dual modes of operation. One mode may be described as frame replacement, which entails replacing the entire live image 111 with a virtual image 120. The other mode may be described as partial replacement, which may entail combining a virtual image with live images 111 captured by the image capture device 205. For example, in the latter mode of operation, the video muter 210 may combine a virtual image 120 of a user with live images from the background of the users environment.

For example, the replacement module 245 may identify and replace the user's face captured in the live video with stored images of the user's face. The stored images of the user's face may be retrieved from the user's template in the gesture library 240. Replacing only the user's face will ensure that elements of the user's appearance that change over time, such as clothing, jewelry, hairstyles, etc. remain consistent during the transition from the live video to the virtual image 120. Therefore, the virtual image 120 will be a more realistic and accurate representation of the user's appearance immediately prior to the invocation of the mute function.

In examples where the user is positioned in close proximity to the video capture device 205 or transmitting a close-up or zoomed-in view of the user's face without capturing any images of the user's body, the need to replace a user's face in a live image may be obviated. That is, because only images of the user's face are being transmitted during the live video, the replacement module 245 may substitute the live video of the user's face with stored images of the user's face without having to integrate stored images of the user's face with the live images of the user's body.

The virtual image 120 may be continually updated and modified to generate a more realistic representation of live video. For example, the user may have a user template stored in the gesture library 240. The replacement module 245 may continually retrieve images and data from the user's template to supplement the virtual image 120. For instance, the gesture library 240 may contain a video clip of the user squinting and turning his head to the right. The replacement module 245 may insert this video clip into the virtual image 120 to make it seem as though the user is squinting and turning his head to the right in real time. Participants to the video application may interpret this movement as an indication that the user is actively participating in the video application. The replacement module 245 may utilize any images or data in the gesture library to enhance the realism of the virtual image 120.

Before the replacement module 245 replaces live images of the user with stored images of the user, the replacement module may determine if the appearance of the stored images of the user approximate the appearance of the live images of the user. This process may not be necessary because features of a user's face may not change often. However, certain aspects of the appearance of a user's face may change, such as facial hair, facial jewelry, make-up, etc. When stored images of a user do not substantially match the live images of the user, the replacement module 245 may digitally augment the stored images of the user to match the live images of the user or may user vector motion models to deconstruct and manipulate individual elements of the live images of the user to recreate movement and gestures.

The replacement module 245 may digitally augment stored images when the replacement module 245 determines that a stored image does not accurately match the live image. Digital augmentation may include the alternation of any aspect of an image or portion of an image, such as altering, removing, or adding color, lighting, shading, shape, size, etc. For example, the replacement module 245 may determine that the user is wearing a mustache and a blue shirt in the live image 111. However, the stored images of the user may only contain images of the user without a mustache and wearing a red shirt. Therefore, the replacement module 245 may digitally augment the stored images by recreating a mustache in the stored images of the user and changing the color of the user's shirt from red to blue. In this manner, the live images of the user may be replaced with the digitally augmented stored images of the user to create an accurate representation of the user's current appearance in the virtual image 120.

Recreating a user's movements and gestures when the user's stored appearance fails to substantially match the user's live appearance may also be accomplished with the utilization of vector motion models. The replacement module 245 may have the capability to deconstruct and manipulate individual elements of a live image 111 to virtually recreate a gesture. For example, a user may commonly move his hand up from this side to scratch his head. The gesture library 240 may contain stored video of the user performing this gesture, however, the replacement module 245 may determine that certain aspects of the user's appearance in the stored video, such as the color of the user's shirt, do not match the live images of the user. In this case, the replacement module 245 may utilize a live image of the user's arm, or any other part of the image, deconstruct, and individually move different elements of the user's arm, such as the upper arm, lower arm, shoulder, fingers, etc. The replacement module 245 may rely on vector motion models stored in the gesture library 240 to determine where and how far to move each individual element of the user's arm. In this manner, the replacement module 245 may recreate the movements and gestures of the user without the need to substitute any stored images into the live image 111 of the user. This is because the replacement module 245 may use the live image of the user to recreate the user's movements to create the virtual image 111.

The replacement module 245 may also rely on generic images and/or generic vector motion models, as well as computer generated images or animation to recreate movement and gestures. Generic images may include sample images of a "female neck" or a "male shoulder," for example, which may aid the replacement module 245 in the generation of a virtual image 120 when such images are needed to recreate a gesture. Similarly, generic vector motion models may include the data needed to recreate any movement, such as the turn of a head. Therefore, gestures stored under generic vector motion models may be applied to the virtual image 120 of any user, even if a particular user does not have a stored vector motion model for that gesture. In this manner, the replacement module 245 may need only a single frame of an image of a user to recreate gestures using generic vector motion models. The replacement module 245 may also utilize computer generated images and animation to supplement or replace any portion of an image or gesture.

When the replacement module 245 has generated a virtual image 120, the replacement module 245 may present the virtual image 120. Presenting the virtual image 120 may include transmitting, or otherwise transferring the virtual image 120 through any wired or wireless connection or network. The virtual image 120 may be transmitted to a video device. Presenting the virtual image 120 may also include displaying the virtual image 120 in the display 212. When displayed on the display 212, the virtual image 120 may be viewed by other participants of a video application.

Before the virtual image 120 is presented, the virtual image 120 may be synchronized by the synchronization module 250. The synchronization module 250 may be any hardware, software, or combination of hardware and software capable of synchronizing the transition between the presentation of the virtual image 120 and the cessation of the live image 111 captured immediately prior to the invocation of the mute function. The synchronization process includes matching any aspect of the appearance of the last images captured prior to the termination of the live images with the initial images of the virtual image 120. Appearance aspects may include the stance, pose, direction, position, emotion, etc. of the user. For example, when the user invokes a mute function, the user may be facing to the right. The synchronization module 250 may determine that the user is facing towards the right and may begin the virtual image 120 with images of the user facing towards the right. In this manner, a seamless transition between live images and virtual images may be presented, such that other participants to the video application are unaware of the transition.

The synchronization module 250 may also synchronize the transition between the cessation of the presentation of the virtual image 120 and the resumption of the live image 111. Thus, when the user is prepared to return to the presentation of the live image 111, the user may deselect the mute function. Instead of immediately resuming the presentation of the live image 111, the synchronization module 250 may receive live images of the user and merge the virtual image of the user to be in synchronization with the live image of the user. For example, if the user is turned to the left when the user deselects the mute function, the synchronization module 250 will instruct the virtual image 120 of the user to turn to the left before resuming the live image 120.

Figure 4:
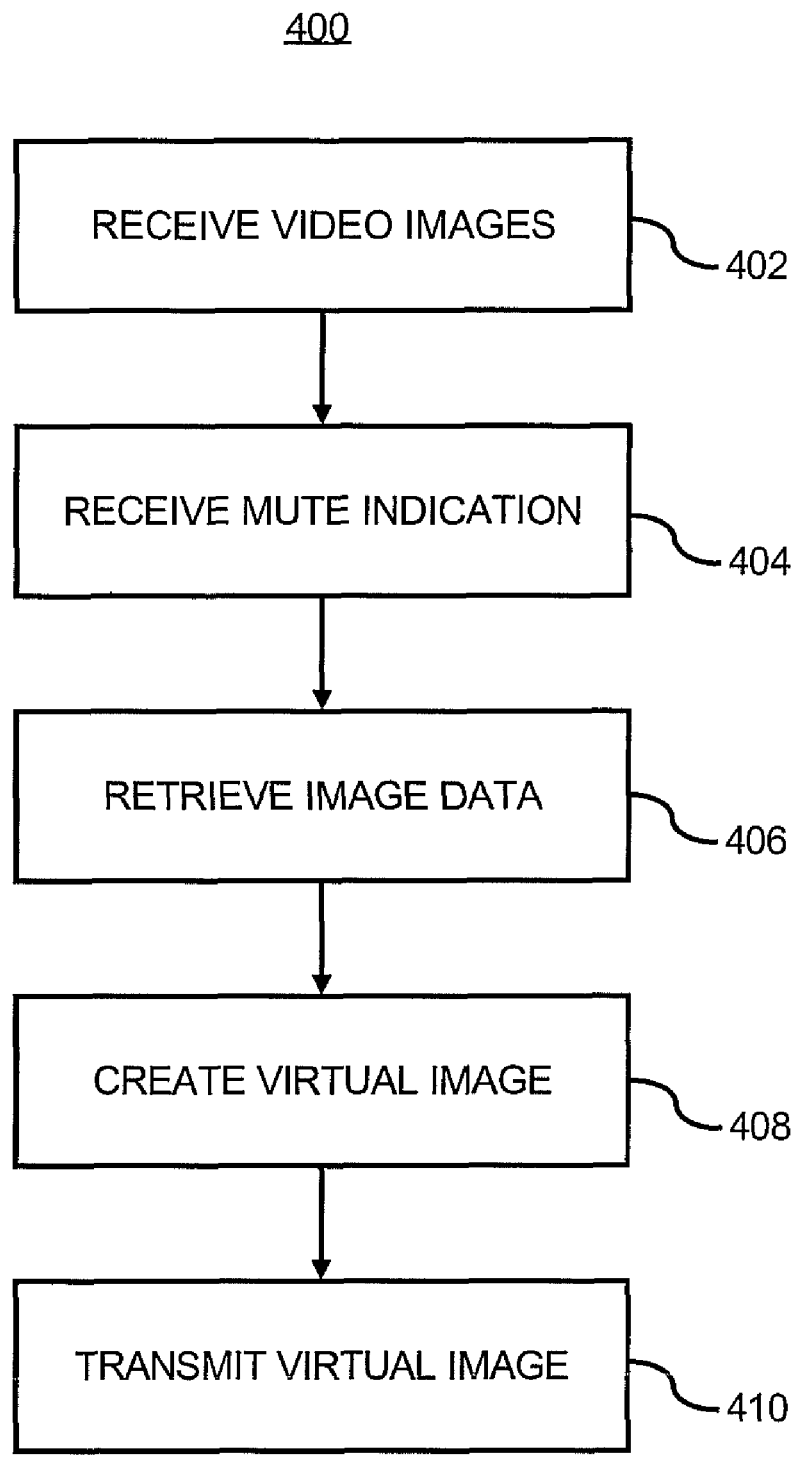
FIG. 4 illustrate a flow chart of a method of performing a video mute function.

FIG. 4 depicts a flow chart of an illustrative method 400 of the steps of a mute process. The method 400 is described with respect to the block diagram 200 illustrated in FIG. 2 by way of example and not limitation and it will be apparent that the method 400 may be used in other systems. Moreover, it will also be apparent to a person having ordinary skill in the art that certain steps in the method 400 are optional and that a mute function may be performed without practicing certain steps illustrated in FIG. 4. Similarly, additional steps may be inherent or added to the method 400.

At step 402, video images may be received. Video images may be captured by the image capture device 205 and received by the video muter 210. Specifically, the images may be received by the training module 225 of the video muter 210. The video muter 210 may be a component of a videophone or a videoconferencing device. The images may be analyzed by the training module 225, the face training sub-module 230, and/or the gesture training sub-module 235. The received images and the results of the analysis of the received images may be stored in the gesture library 240 as image data. The image data may be cataloged into templates.

At step 404, a mute indication may be received. The mute indication may be user input including the indication of the selection of a mute function. The mute indication may be received by the video muter 210.

At step 406, image data may be retrieved. Image data may include the video images received in step 402 and the analysis of the video images from step 402. Image data may also include any other information or data useful in the generation of the virtual image 120. For example, image data may include any information in a template, generic information, or any computer generated information. Image data may be retrieved from the gesture library 240.

At step 408, a virtual image 120 is created. The virtual image 120 may be a representation of the images received in step 402 and may be created by modifying at least a portion of the images received in step 402 with the image data retrieved from the gesture library 240. The virtual image 120 may be generated by any method or combination of methods described above.

At step 410, the virtual image 120 may be transmitted. For example, the virtual image 120 may be transmitted to the display 212 and presented to a user by displaying the virtual image 120 on the display 212. The virtual image 120 may be transmitted through any network described above.

Figure 5:
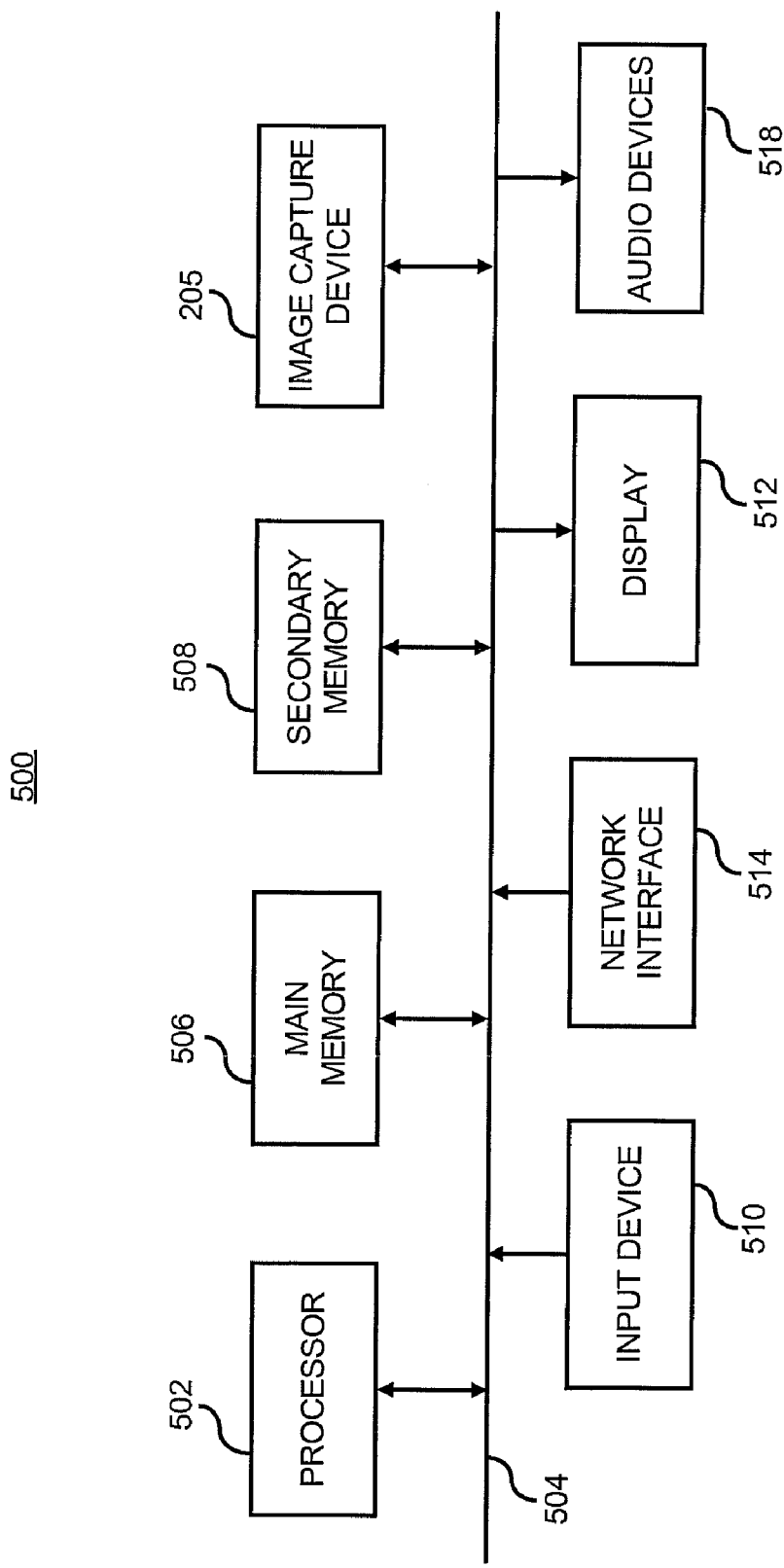
FIG. 5 illustrates a block diagram of a computing platform.

FIG. 5 illustrates a block diagram of a general purpose computer system 500 that is operable to be used as a platform for the components video mute system described above. The system 500 may be used as, or may comprise a part of the video muter 210 or a video device containing the components of the video muter 210. Furthermore, components may be added or removed from the computer system 500 to provide the desired functionality.

The computer system 500 includes processor 502, providing an execution platform for executing software. Commands and data from the processor 502 are communicated over a communication bus 504. The computer system 500 also includes a main memory 506, such as a Random Access Memory (RAM), where software may reside during runtime, and a secondary memory 508. The secondary memory 508 includes, for example, a hard disk drive and/or a removable storage drive representing a floppy diskette drive, a magnetic tape drive, a compact disk drive, etc., or a nonvolatile memory where a copy of the software is stored. In one example, the secondary memory 508 also includes ROM (read only memory), EPROM (erasable, programmable ROM), EEPROM (electrically erasable, programmable ROM). The computer system 500 includes a display 512 and user interfaces comprising one or more input devices 510, such as a keyboard, a mouse, a stylus, and the like. However, the input devices 510 and the display 512 are optional as well as other shown components. A network interface 514 is provided for communicating with other computer systems. The network interface 514 may be present in the media device 110 or the filter module 205, and may facilitate connection to a network. The computer system 500 may also include an image capture device 205, which may be a camera, and audio devices 518, such as microphones, speakers, etc.

One or more of the steps described herein are operable to be implemented as software stored on a computer readable medium, such as the memory 506 and/or 508, and executed on the computer system 500, for example, by the processor 502.

The steps are operable to be embodied by a computer program, which can exist in a variety of forms both active and inactive. For example, they exist as software program(s) comprised of program instructions in source code, object code, executable code or other formats for performing some of the steps. Any of the above can be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of muting a video application, the method comprising:
   receiving video images;
   receiving an indication of a selection of a mute function;
   retrieving image data from a gesture library;
   modifying at least a portion of the retrieved image data to match the received video images;
   modifying at least a portion of the received video images with the modified image data to create a virtual image; and
   transmitting the virtual image.

2. The method of claim 1 wherein receiving video images comprises:
   receiving video images of a user and wherein the virtual image includes a representation of the user.

3. The method of claim 1 wherein retrieving image data comprises:
   retrieving at least portions of stored images from the gesture library.

4. The method of claim 1 wherein retrieving image data comprises:
   retrieving vector motion models from the gesture library.

5. The method of claim 1 further comprising:
   displaying the virtual image.

6. The method of claim 1 wherein modifying at least a portion of the received video images comprises:
   modifying at least a portion of an image of a user's face captured in the received video images with image data retrieved from the gesture library.

7. The method of claim 1 further comprising:
   synchronizing the transition of at least one of: a cessation of a presentation of live images and the presentation of the virtual image and a cessation of the presentation of the virtual image and a presentation of live images.

8. A system for muting a video device, the system comprising:
   an image capture device for capturing video images;
   a gesture library for storing image data; and
   a replacement module for retrieving image data from the gesture library, for modifying at least a portion of the retrieved image data to match captured video images, for modifying at least a portion of a captured video image with the modified image data to create a virtual image, and for transmitting the virtual image in response to receipt of user input indicating a selection of a mute function.

9. The system of claim 8 wherein the captured video images include images of a user and wherein the virtual image includes a representation of the user.

10. The system of claim 8 wherein the image data stored in the gesture library includes a template for a user.

11. The system of claim 10 wherein the template includes at least one of stored images of the user and vector motion models.

12. The system of claim 8 wherein the virtual image includes images modified by digital augmentation.

13. The system of claim 8 further comprising:
   a gesture training sub-module for analyzing movement in the video images captured by the image capture device.

14. The system of claim 8 further comprising a training module for: receiving images of a user, analyzing the received images of the user, and storing the images of the user and the result of the analysis of the images of the user in the gesture library.

15. The system of claim 8 wherein the virtual image is created from deconstructing a portion of the image within a frame of the video images captured by the image capture device and applying a vector motion model to the portion of the image to simulate a gesture.

16. The system of claim 8 further comprising a synchronization module for synchronizing a transition between at least one of: a cessation of a presentation of live images and the presentation of the virtual image and a cessation of the presentation of the virtual image and a presentation of live images.

* * * * *